(12) United States Patent
Tatara et al.

(10) Patent No.: US 7,752,905 B2
(45) Date of Patent: Jul. 13, 2010

(54) GREEN TIRE INSPECTION APPARATUS AND METHOD THEREFOR

(75) Inventors: Tetsuo Tatara, Osaka (JP); Hirokatsu Mizukusa, Osaka (JP); Tomoyuki Takatsuka, Osaka (JP); Osamu Fujiki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 72 days.

(21) Appl. No.: 12/278,432

(22) PCT Filed: Feb. 8, 2006

(86) PCT No.: PCT/JP2006/302164

§ 371 (c)(1),
(2), (4) Date: Nov. 18, 2008

(87) PCT Pub. No.: WO2007/091314

PCT Pub. Date: Aug. 16, 2007

(65) Prior Publication Data

US 2009/0095065 A1 Apr. 16, 2009

(51) Int. Cl.
*G01M 17/02* (2006.01)
*B29C 35/02* (2006.01)

(52) U.S. Cl. ........................ 73/146; 425/34.1
(58) Field of Classification Search .............. None
See application file for complete search history.

(56) References Cited

U.S. PATENT DOCUMENTS

| 5,928,675 | A * | 7/1999 | Irie ............................. 425/34.1 |
| 6,499,980 | B1 * | 12/2002 | Fledderjohann et al. .... 425/34.1 |
| 2003/0211273 | A1 * | 11/2003 | Perry et al. ................. 428/41.8 |
| 2005/0019440 | A1 * | 1/2005 | Galigani et al. ............... 425/36 |
| 2005/0051256 | A1 | 3/2005 | Yovichin et al. |
| 2005/0274269 | A1 * | 12/2005 | Nishimoto et al. .......... 101/288 |

FOREIGN PATENT DOCUMENTS

| JP | 2001-212888 A | 8/2001 |
| JP | 2003-200721 A | 7/2003 |
| JP | 2005-81845 A | 3/2005 |

OTHER PUBLICATIONS

International Search Report of PCT/JP2006/302164, date of mailing Apr. 25, 2006.

* cited by examiner

*Primary Examiner*—Andre J Allen
(74) *Attorney, Agent, or Firm*—Westerman, Hattori, Daniels & Adrian, LLP

(57) ABSTRACT

An improvement is achieved in productivity of a tire by preventing an unacceptably molded green tire, which is produced in a molding process, from flowing to a vulcanizing process. Measures therefor comprise putting an unvulcanized green tire on a mount surface of a mount stage, sticking an information label to a side wall of the green tire with a label sticking device arranged below a through-hole formed in a position, which corresponds to an inside of a bead body of the green tire, on the mount surface, and measuring a weight of the green tire with a gravimeter, which supports the mount stage.

8 Claims, 4 Drawing Sheets

GREEN TIRE INSPECTION APPARATUS AND METHOD THEREFOR

TECHNICAL FIELD

The present invention relates to an inspection apparatus for unvulcanized green tire and a method therefor.

BACKGROUND ART

Generally, a tire is composed of a plurality of rubber members and a plurality of reinforcement members mainly formed from cords. Typically, as shown in FIG. 4, respective parts, such as an inner liner 1, a tread 2, side walls 3, chafers 4, etc., which are formed from rubber members conformed to demanded properties, are combined on a molding drum with a carcass layer 6, belt layers 7, and bead bodies 8, which comprise a reinforcement member containing cords, to mold a green tire T, and the green tire T is transferred onto a vulcanizing metal mold from the molding drum to perform a vulcanizing process to manufacture a tire. A vulcanized tire as manufactured is subjected to quality inspection, such as uniformity, weight measurement, etc., through after-treatment process such as cleaning trimming and then shipped (see, for example, Patent Document 1).

Patent Document 1: JP-A-2004-306495

DISCLOSURE OF THE INVENTION

Problems that the Invention is to Solve

In the molding process of a green tire as described above, in the case where an unacceptably molded green tire is produced due to unfinished assembling and surplus assembling of tire constituent members, etc., such unacceptably molded green tire is determined as an unacceptable product in the state of quality inspection subsequent to a vulcanizing process to be struck off an object of shipment. Therefore, a conventional tire manufacturing process involves a problem that an unacceptably molded green tire flows to a vulcanizing process and an after-treatment process to cause a decrease in productivity.

Hereupon, the invention has been thought of in view of the problem and has its object to provide a green tire inspection apparatus capable of preventing that decrease in productivity, which an unacceptably molded green tire produced in a molding process flows to subsequent processes to cause, and a method therefor.

Means for Solving the Problem

A green tire inspection apparatus of the invention has a feature in comprising a mount stage, which supports an unvulcanized green tire put on amount surface, a label sticking device arranged below a through-hole formed in a position, which corresponds to an inside of a bead body of the green tire, on the mount surface, and a gravimeter, which supports the mount stage, and in that an information label is stuck to a side wall of the green tire put on the mount surface by the label sticking device and a weight of the green tire is measured by the gravimeter.

According to the invention, by measuring a weight of a green tire when an information label is stuck to the green tire, it is possible to detect an unacceptable green tire attributable to unfinished assembling of tire constituent members, surplus assembling of unnecessary tire constituent members, or the like, and it is possible to prevent an unacceptable green tire from flowing to a subsequent process such as a vulcanizing process, etc. without an increase in cycle time of a tire manufacturing process.

The green tire inspection apparatus described above may comprise a positioning mechanism, in which a pair of moving plates projecting upward from below the through-hole expand and contract in diameter inside the bead body of the green tire put on the mount surface while synchronizing with each other in a tire radial direction, whereby it is possible to stick an information label in a predetermined position on a side wall in a tire radial direction.

Further, the green tire inspection apparatus described above may comprise a data processing unit, which gives tire information including an identification mark of a green tire to the information label and records the identification mark and a weight value of a green tire measured by the gravimeter while having them corresponding to each other, whereby it is possible to perform uniform management of a vulcanizing process and an after-treatment process subsequent to a molding process of a green tire, thus enabling an improvement in efficiency in respective processes.

A green tire inspection method, according to a further invention has a feature in putting an unvulcanized green tire on a mount surface of a mount stage, sticking an information label to a side wall of the green tire with a label sticking device arranged below a through-hole formed in a position, which corresponds to an inside of a bead body of the green tire, on the mount surface, and measuring a weight of the green tire with a gravimeter, which supports the mount stage.

In the green tire inspection method, the green tire may be positioned in a predetermined position by causing a pair of moving plates, which project upward from below the through-hole, to expand in diameter inside the bead body of the green tire put on the mount surface while having the moving plates synchronizing with each other in a tire radial direction, tire information including an identification mark of a green tire may be given to the information label, and the identification mark and a weight value of a green tire measured by the gravimeter may be recorded corresponding to each other.

EFFECT OF THE INVENTION

According to the invention, it is possible to prevent an unacceptably molded green tire from flowing to a vulcanizing process, thus enabling an improvement in productivity.

BEST MODE FOR CARRYING OUT THE INVENTION

An embodiment of the invention will be described in detail below with reference to the drawings.

FIG. 1 is a schematic view showing a part of a tire molding equipment 10, in which an inspection apparatus 20 for green tire, according to an embodiment of the invention, is used, FIG. 2 is a front view showing the inspection apparatus 20 for green tire, and FIG. 3 is a plan view showing the inspection apparatus 20 for green tire.

The tire molding equipment 10 comprises a molding apparatus for molding an unvulcanized green tire T having a structure shown in FIG. 4, and molds a green tire T by laminating a carcass ply, which constitutes a carcass layer 6, on a rubber layer, which includes an inner liner 1 and chafers 4, to mold a cylindrical-shaped carcass band, thereafter setting and turning up bead bodies 8 on the carcass band to assemble a cylindrical-shaped green case before shaping, and laminating belt layers 7 and a rubber member, which constitutes a tread 2, on the green case.

As shown in FIG. 1, the green tire T as completed is moved to a take-out position in a state, in which the bead bodies 8 are internally supported by a drum D, and delivered to a take-out device 12 by releasing holding by the drum D and having the take-out device 12 grasping an outer periphery thereof. After being rotated so that a central axis of the green tire T as delivered to the take-out device 12 agrees with a vertical direction, the green tire is moved to the inspection apparatus by conveyance means 14 and then moved to a placement base to be taken out from the tire molding equipment 10.

As shown in FIGS. 2 and 3, the inspection apparatus 20 for green tire includes a mount stage 30 supported by a gravimeter 22 and a label sticking device 24 arranged below a mount surface 32, on which the green tire T is mounted, on the mount stage 30, measures a weight of the green tire T mounted on the mount surface 32, and sticks a bar code being an information label to the side wall 3 of the green tire T.

More specifically, a plurality of support shafts 36 provided upright on a bottom plate 34 arranged on a measurement surface 22a of the gravimeter 22 support the mount surface 32 and guides 28 fixed to a housing 26 of the inspection apparatus support the support shafts 36 vertically slidably whereby the mount stage 30 enables the gravimeter 22 to measure the weight of a green tire T put on the mount surface 32. The measured weight of the green tire T is transmitted to a data processing unit 16.

A through-hole 38 is formed in a position, which corresponds to insides of the bead bodies 8 of the green tire T, on the mount surface 32 and the label sticking device 24 controlled by the data processing unit 16 is arranged below the through-hole whereby a bar code label is stuck to the side wall 3 of the green tire T put on the mount surface 32.

Information including a tire identification mark being an identification mark of the green tire T, to which the label is stuck, is given as tire information to the bar code label, and the tire identification mark is caused to correspond to information related to a kind and a year-month-day of the tire and information related to a molding apparatus used for molding to be recorded in database stored in the data processing unit 16 and caused to correspond to a measured weight being results of measurement on the gravimeter 22 to be recorded in database. In addition, information related to a kind and a year-month-day of the tire and a molding apparatus used for molding may be applied directly to tire information.

A permissible weight range of a green tire T is beforehand stored every kind of a tire in predetermined database stored in the data processing unit 16 and an unacceptable green tire attributable to unfinished assembling of tire constituent members, surplus assembling of unnecessary tire constituent members, or excess and shortage of rubber strip extruded from an extruding machine can be detected by accessing a permissible weight range corresponding to a tire kind of a green tire T put on the inspection apparatus 20 and determining whether the measured weight is within the permissible weight range, so that it is possible to prevent an unacceptable green tire from flowing to a subsequent process such as a vulcanizing process, etc.

Also, since when a bar code label is stuck to a green tire T, it is possible in the inspection apparatus 20 to determine whether the green tire is an unacceptably molded tire, an increase in cycle time in a tire manufacturing process is eliminated.

Also, provided on the inspection apparatus 20 is a positioning mechanism 40 including a pinion 42 fixed to a rotating shaft of a motor (not shown), a pair of racks 44, 44 meshing therewith, and moving plates 46, 46 fixed to the respective racks 44, 44 to project upward from below the through-hole 38 formed on the mount surface 32, so that the motor is actuated to rotate the pinion 42 whereby the pair of moving plates 46, 46 interlock with the racks 44, 44 to expand and contract in diameter while synchronizing with each other in a tire radial direction.

In a state, in which the moving plates 46, 46 contract in diameter in the tire radial direction, a green tire T is transferred from the take-out device 12 whereby the moving plates 46, 46 are inserted inside bead bodies 8 and in the state, the moving plates 46, 46 are expanded in diameter until attaining substantially the same interval as an inside diameter of the bead bodies 8. At this time, by having the moving plates 46, 46 abutting against an inner periphery of at least one (for example, a lower one) of the bead bodies 8, a central axis of the green tire T is caused to agree with a midpoint position of the moving plates 46, 46, which corresponds to a center position of expanding and contracting diameters of the moving plates 46, 46, thus enabling positionally regulating the green tire T put on the mount stage 30 to a predetermined position. Thereby, it is possible to stick a bar code label in a predetermined position on the side wall 3 in the tire radial direction, thus enabling decreasing an error in reading of a bar code label in a bar code reader.

In addition, while the embodiment uses a bar code label as an information label, the invention is not limited thereto but a two-dimensional bar code such as QR cord or the like may be used.

DESCRIPTION OF REFERENCE NUMERALS AND SIGNS

Figure 1:
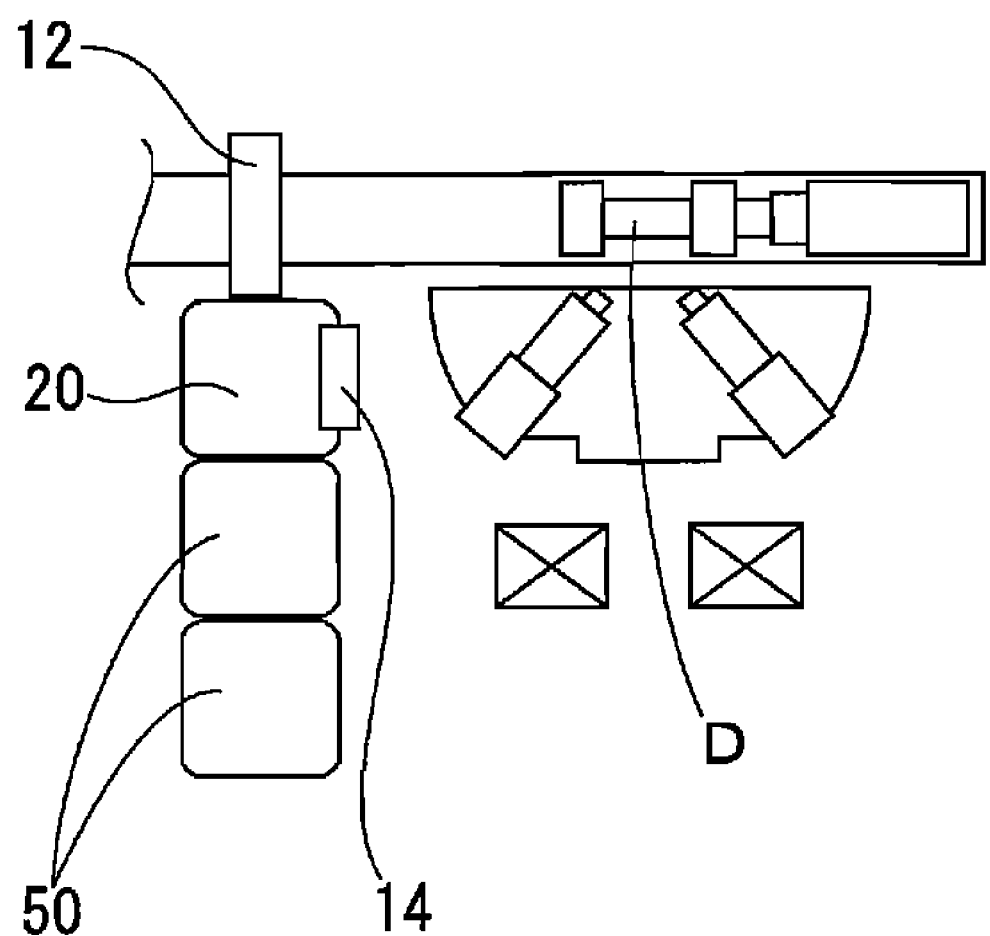
FIG. 1 is a schematic view showing a tire molding equipment, in which an green tire inspection apparatus according to an embodiment of the invention is used.
Figure 2:
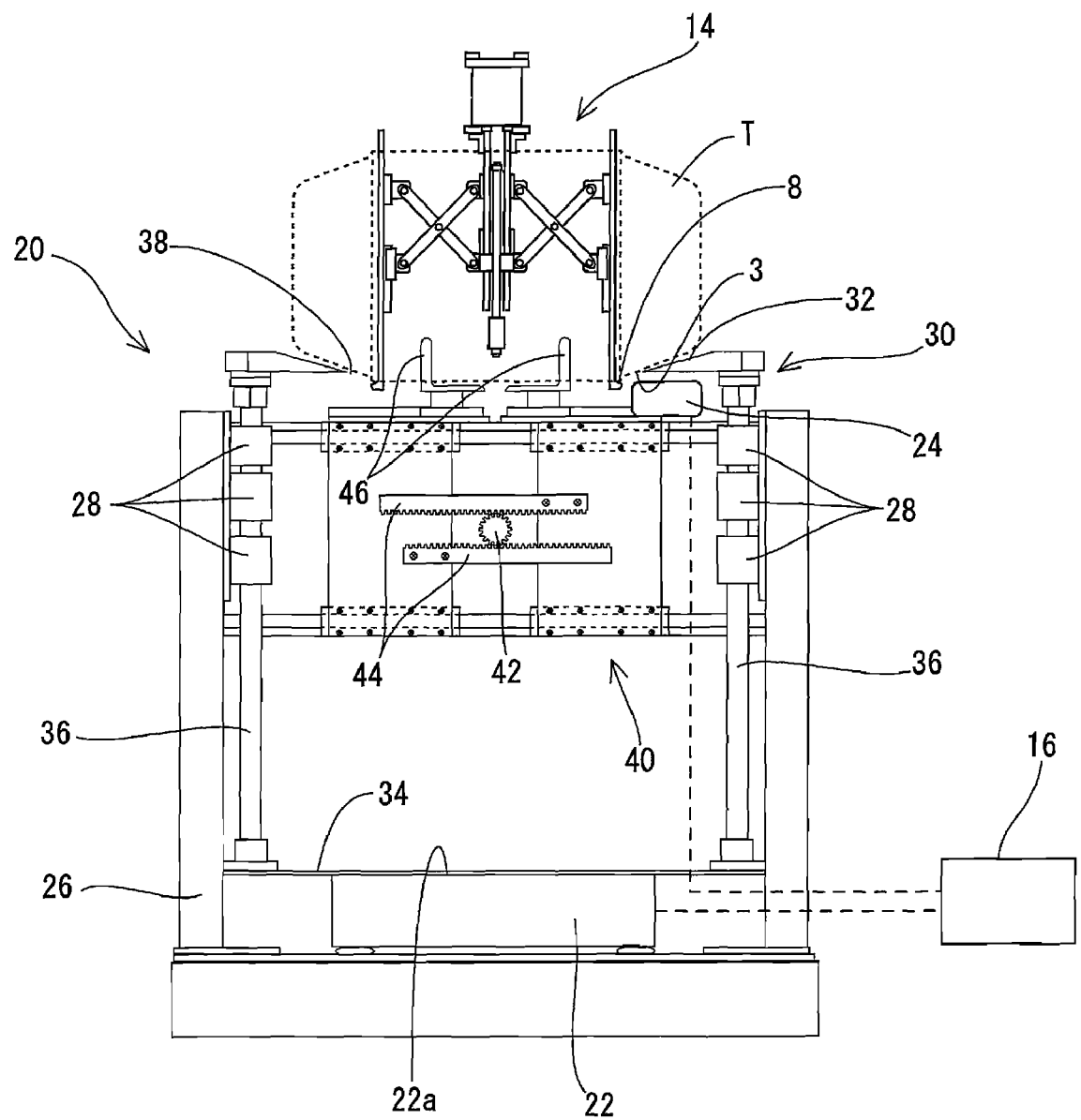
FIG. 2 is a front view showing the green tire inspection apparatus according to the embodiment of the invention.
Figure 3:
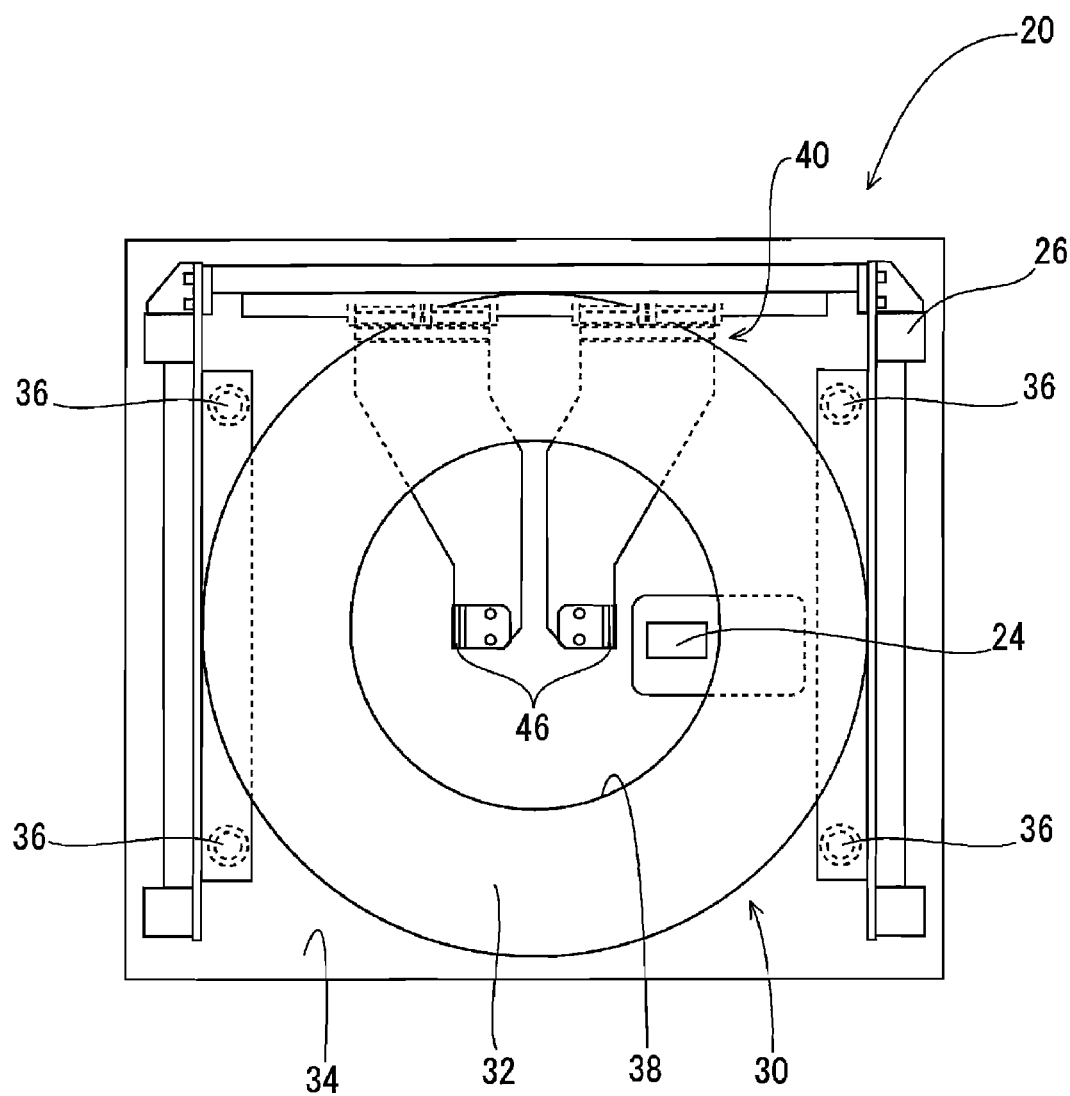
FIG. 3 is a plan view showing the green tire inspection apparatus according to the embodiment of the invention.
Figure 4:
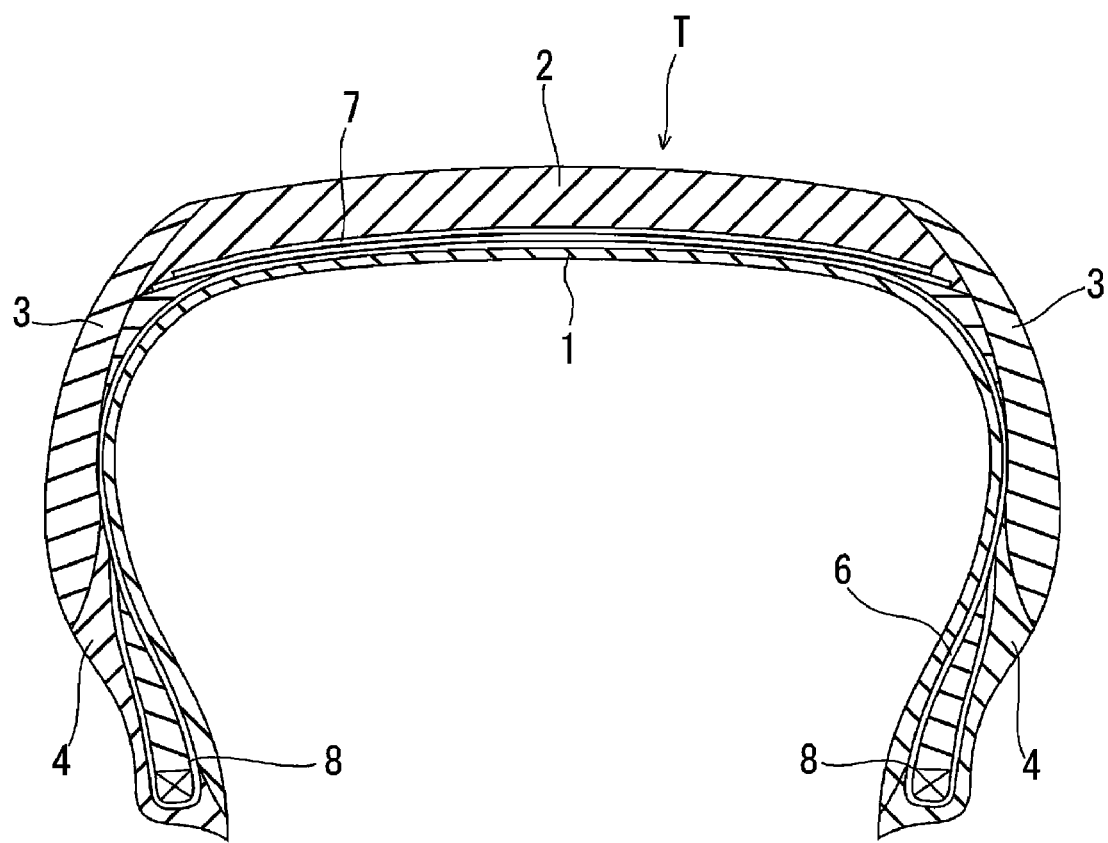
FIG. 4 is a cross sectional view showing a green tire.

1: inner liner, 2: tread, 3: side wall, 4: chafer, 6: carcass layer, 7: belt layer, 8: bead body, 10: tire molding equipment, 12: take-out device, 14: conveyance means, 16: data processing unit (arithmetic processing unit), 20: inspection apparatus, 22: gravimeter, 22a: measurement surface, 24: label sticking device, 26: housing, 28: guide, 30: mount stage, 32: mount surface, 34: bottom plate, 36: support shaft, 38: through-hole, 40: positioning mechanism, 42: pinion, 44: rack, 46: moving plate, 50: placement base, T: green tire

The invention claimed is:

1. A green tire inspection apparatus comprising a mount stage, which supports an unvulcanized green tire put on a mount surface, a label sticking device arranged below a through-hole formed in a position, which corresponds to an inside of a bead body of the green tire, on the mount surface, and a gravimeter, which supports the mount stage, and
   wherein an information label is stuck to a side wall of the green tire put on the mount surface by the label sticking device and a weight of the green tire is measured by the gravimeter.

2. The green tire inspection apparatus according to claim 1, further comprising a positioning mechanism, in which a pair of moving plates projecting upward from below the through-hole expand and contract in diameter inside the bead body of the green tire put on the mount surface while synchronizing with each other in a tire radial direction.

3. The green tire inspection apparatus according to claim 1, further comprising a data processing unit, which gives tire information including an identification mark of a green tire to the information label and records the identification mark and a weight value of a green tire measured by the gravimeter while having them corresponding to each other.

4. A green tire inspection method comprising the steps of: putting an unvulcanized green tire on a mount surface of a mount stage, sticking an information label to a side wall of the green tire with a label sticking device arranged below a through-hole formed in a position, which corresponds to an inside of a bead body of the green tire, on the mount surface, and measuring a weight of the green tire with a gravimeter, which supports the mount stage.

5. The green tire inspection method, according to claim 3, wherein the green tire is positioned in a predetermined position by causing a pair of moving plates, which project upward from below the through-hole, to expand in diameter inside the bead body of the green tire put on the mount surface while having the moving plates synchronizing with each other in a tire radial direction.

6. The green tire inspection method according to claim 4, wherein tire information including an identification mark of a green tire is given to the information label and the identification mark and a weight value of a green tire measured by the gravimeter are recorded corresponding to each other.

7. The green tire inspection apparatus according to claim 2, further comprising a data processing unit, which gives tire information including an identification mark of a green tire to the information label and records the identification mark and a weight value of a green tire measured by the gravimeter while having them corresponding to each other.

8. The green tire inspection method according to claim 5, wherein tire information including an identification mark of a green tire is given to the information label and the identification mark and a weight value of a green tire measured by the gravimeter are recorded corresponding to each other.

* * * * *